Nov. 11, 1969  H. W. BROWN  3,478,203
LINEAR SCAN READOUT FOR QUANTITIES WHICH VARY IN PROPORTION
TO THE SECOND OR HIGHER POWERS OF APPLIED SCAN FIELD
AND MASS SPECTROMETERS USING SAME
Filed Feb. 21, 1966  4 Sheets-Sheet 2

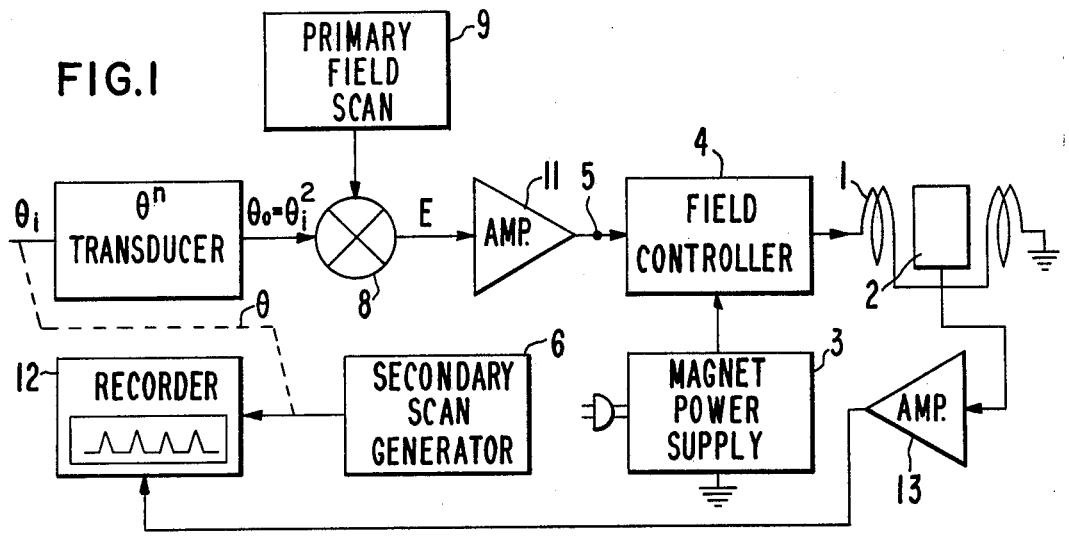
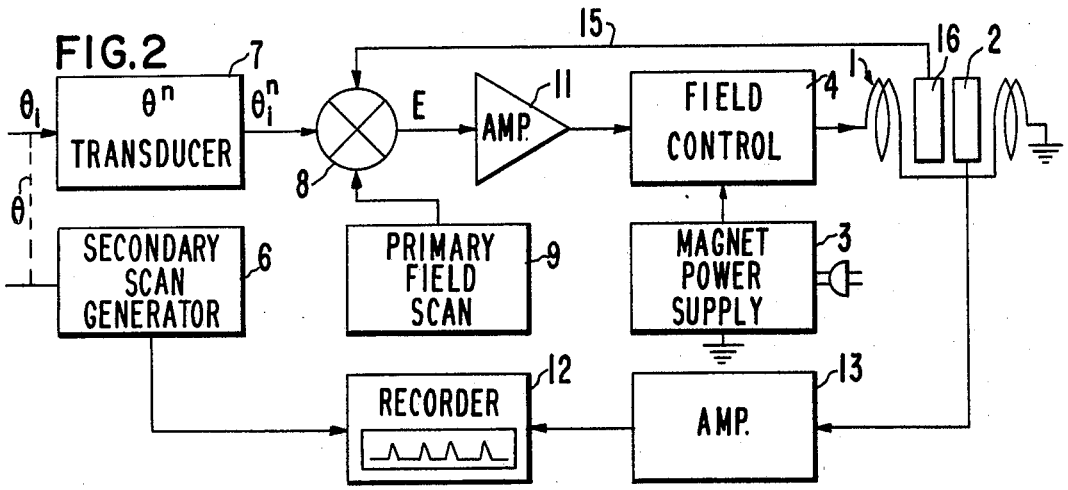
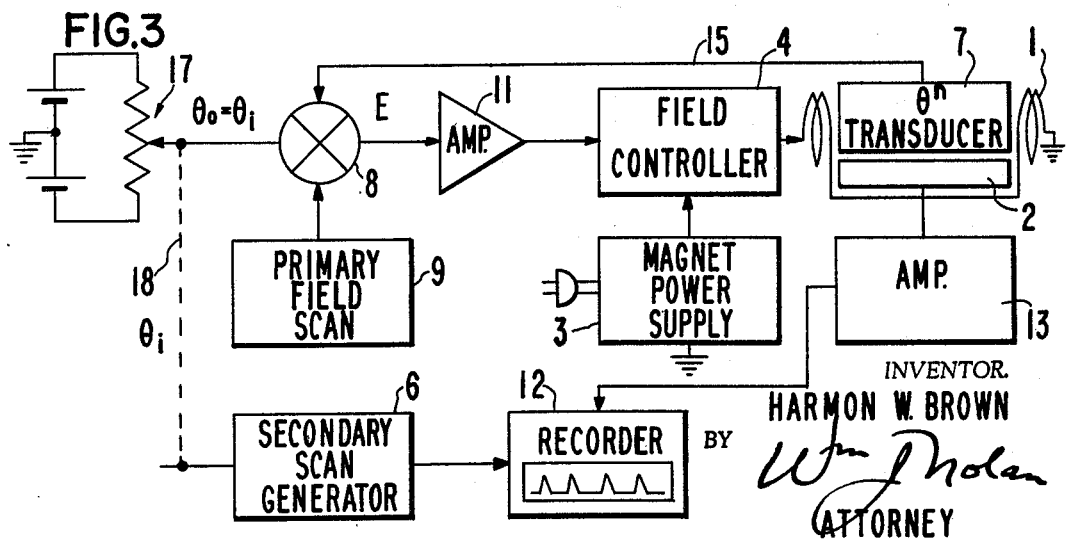

INVENTOR.
HARMON W. BROWN
BY
ATTORNEY

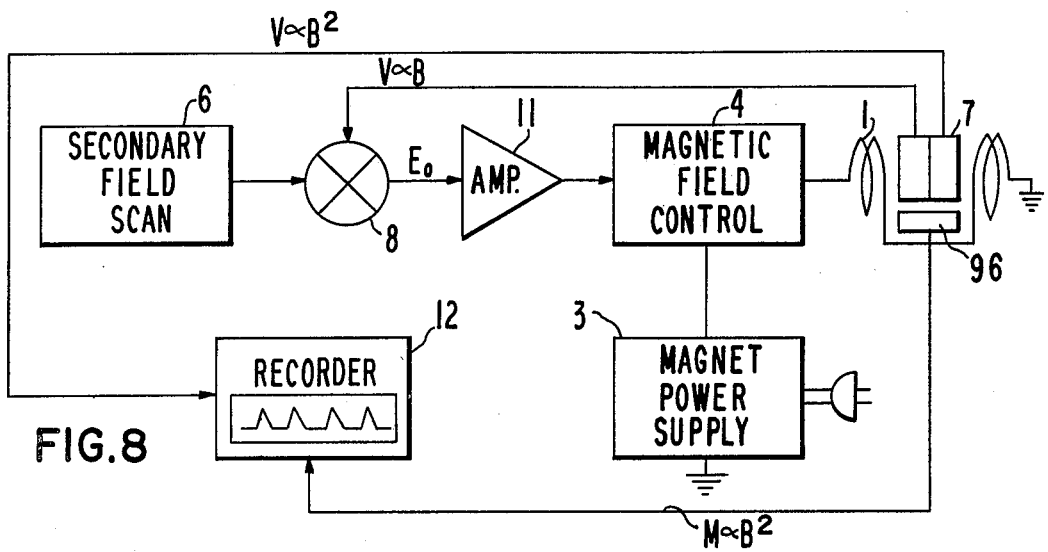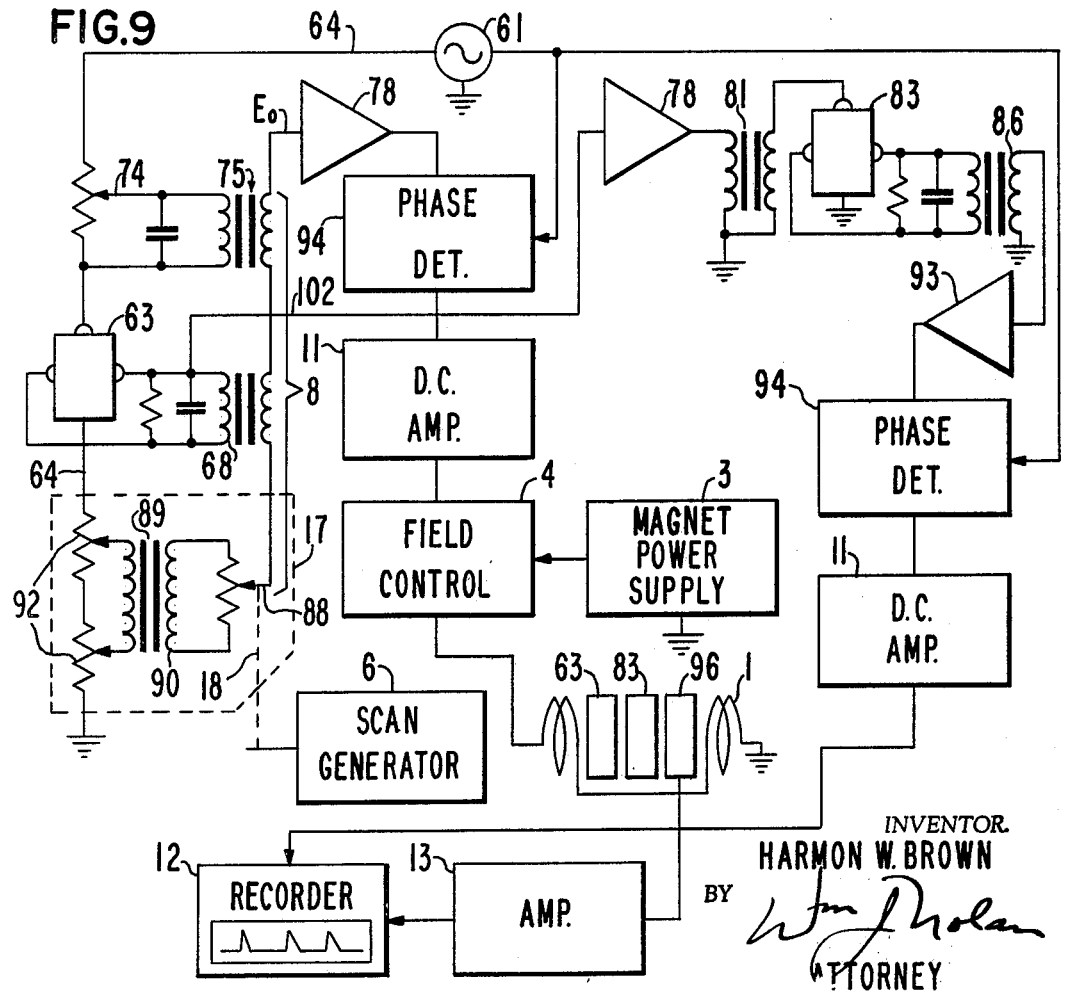

United States Patent Office 3,478,203
Patented Nov. 11, 1969

3,478,203
LINEAR SCAN READOUT FOR QUANTITIES WHICH VARY IN PROPORTION TO THE SECOND OR HIGHER POWERS OF APPLIED SCAN FIELD AND MASS SPECTROMETERS USING SAME
Harmon W. Brown, Sunnyvale, Calif., assignor to Varian Associates, Palo Alto, Calif., a corporation of California
Filed Feb. 21, 1966, Ser. No. 538,126
Int. Cl. B01d 59/44
U.S. Cl. 250—41.9          8 Claims

ABSTRACT OF THE DISCLOSURE

A magnetic field scan apparatus is disclosed. The magnetic field scan apparatus is arranged for producing a linear scan on a magnetic field intensity to a power higher than the first power. The magnetic field scan system includes a magnetic field controller for controlling the intensity of the magnetic field in response to a scanned input quantity. A scan generator generates a linearly scanned output quantity, which is fed to the input of a transducer for transducing the input quantity to an output quantity, which is proportional to the input quantity taken to a power higher than the first power. The output of the transducer forms the linear scanned input quantity to the controller for linear scanning of the magnetic field intensity in proportion to a power of the magnetic field higher than the first. In a preferred embodiment, the transducer includes a series connection of a first and second Hall device disposed in the magnetic field. The output of the Hall transducer will be proportional to the second power of the magnetic field in which it is disposed. The output of the transducer is compared with a linearly scanned input signal in an error detector and the error signal is fed to the field controller to cause the field to track the linearly scanned input signal according to the second power of the magnetic field. The linear scan of the second power of the magnetic field is especially useful for scanning the magnetic field of a magnetically focused mass spectrometer in which the output, in mass units, is proportional to the second power of the magnetic field. Thus, when the detected mass output signals of the magnetically scanned spectrometer are recorded as a function of the linear scan input, the readout is linear in terms of mass units.

---

Figure 4:
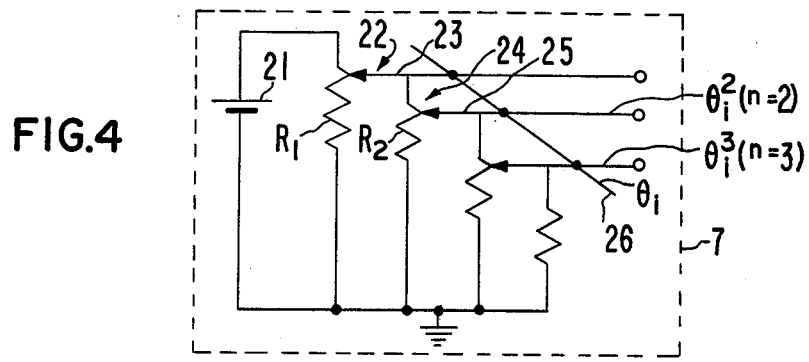

Heretofore cycloidal mass spectrometers have been built which used either a scan of the magnetic or electric fields to obtain mass spectra of substances under analysis. Typical of such spectrometers is the cycloidal mass spectrometer described in U.S. Patent 2,221,467, issued Nov. 12, 1940. In such a spectrometer, employing a fixed focal length, the detected number of atomic mass units of the substance being analyzed is proportional to the focusing magnetic field intensity squared $H^2$ and inversely proportional to the focusing electric field intensity E.

Output mass spectra for these prior spectrometers were typically optained by scanning the electric focusing field intensity E as by discharging a large capacitor through the electric focusing field electrode system. The problem with the capacitor discharge scan arrangement is that it does not produce a scan of the proper function to produce a linear scan of mass units. Furthermore, the electric field intensity required for large dynamic scan ranges becomes excessively large as of for example 10,000 v./cm. for small units of mass. Magnetic scan required a smaller dynamic range for the magnetic field as of, for example, from 0.1–10 kg. However, linear scans of magnetic field produced a non-linear scan of mass units and resulted in the expenditure of much tedious and time consuming effort attempting to calibrate, interpret and analyze the output mass spectra.

In a preferred embodiment of the present invention, means are provided for producing a linear scan of a magnetic field intensity squared, whereby use of this scan in a cycloidal mass spectrometer results in an output mass spectrum which is linear in mass units over a wide dynamic range as of $10^4/1$.

In another embodiment of the present invention, the focusing field is scanned according to a power which produces a scanned output proportional to a power higher than the first. This higher than first power output is recorded against a non-linear scan function of the same power to produce a linear scan readout. For example, the magnetic field of a mass spectrometer is scanned in proportion to the first power of the magnetic field to produce an output mass spectrum signal proportional to the second power of the scanned field. A scan function is generated which is proportional to the second power of the field scan. The second power output spectrum signal is recorded against the second power scan function to produce a mass spectrum readout linear in mass units.

The principal object of the present invention is the provision for a device for producing a linear scan readout of quantities which vary according to a power higher than the first of their focusing fields and provision of such a device in combination with a mass spectrometer to produce output mass spectra linear in mass units, whereby calibration, analysis and interpretation of such spectra are facilitated.

One feature of the present invention is the provision of means for producing a linear scan readout of quantities which vary according to the second or higher power of an applied magnetic field intensity.

Another feature of the present invention is the same as the preceding feature wherein the scan means includes a transducer providing an output which is proportional to the second or higher power of its input and employing this output in obtaining the readout.

Another feature of the present invention is the same as the preceding feature wherein the transducer is used for scanning the magnetic field intensity and the field control circuit is a closed loop circuit with a feedback signal derived from a measurement of the magnetic field being controlled.

Another feature of the present invention is the same as the preceding feature wherein the feedback signal is derived from the output of a Hall-effect semi-conductor, whereby precise control of the field is facilitated over wide dynamic ranges.

Another feature of the present invention is the same as any one or more of the preceding including, in combination, a mass spectrometer having its magnetic focusing field scanned, whereby the output mass spectrum of the spectrometer is provided with a linear scan in mass units, thereby facilitating calibration, analysis and interpretation of the mass spectra obtained therefrom.

Figure 5:
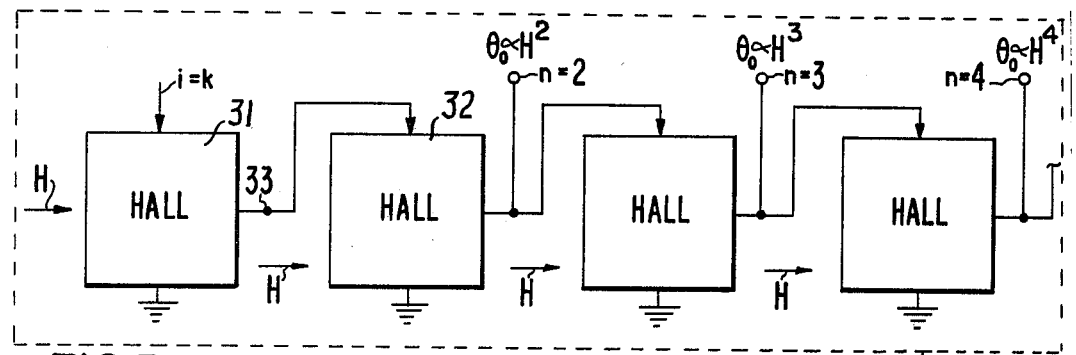
Figure 6:
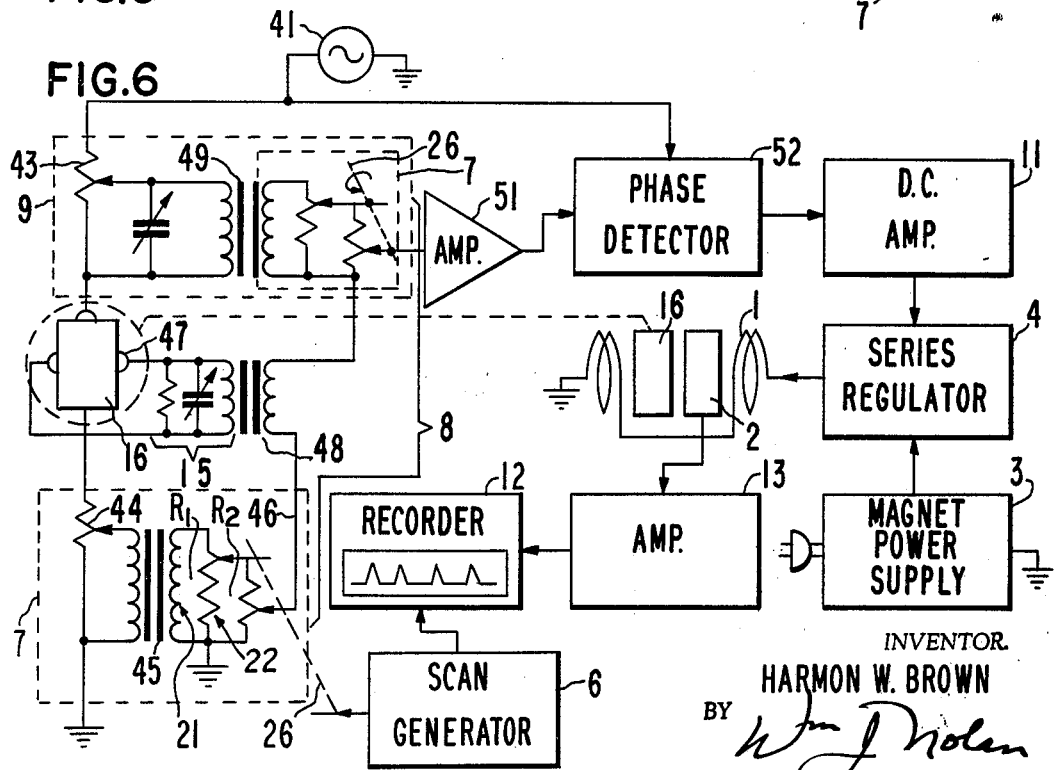
Figure 7:
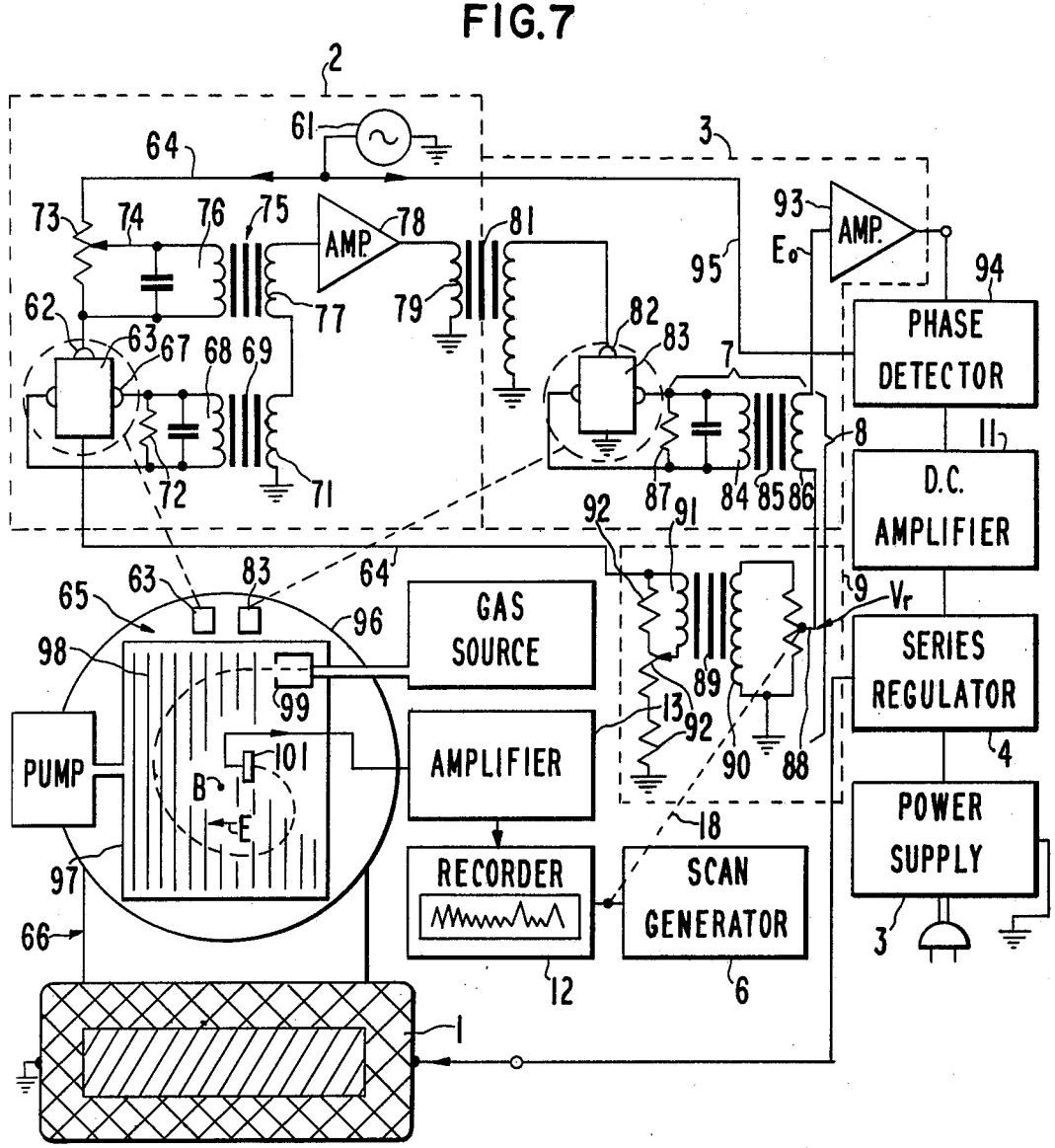

Other features and advantages of the present invention will become apparent upon a perusal of the following specification taken in connection with the accompanying drawings wherein:

FIG. 1 is a schematic block diagram of an open loop magnetic field scanner circuit in combination with a mass spectrometer employing features of the present invention, FIG. 2 is a schematic block diagram of a closed loop magnetic field scanner in combination with a cycloidal spectrometer and embodying features of the present invention, FIG. 3 is a schematic block diagram of an alternative closed loop system to that shown in FIG. 2 and embodying features of the present invention, FIG. 4 is a circuit diagram for a second power transducer, FIG. 5 is a circuit block diagram of an alternative second power transducer, FIG. 6 is a circuit diagram partly in block diagram form of one embodiment of the circuit of FIG. 2, FIG. 7 is a circuit diagram, partly in block diagram form, of one embodiment of the circuit of FIG. 3, FIG. 8 is a schematic (same as FIG. 2), and FIG. 9 is a circuit diagram, partly in block diagram form, of one embodiment of the circuit of FIG. 8.

Referring now to FIG. 1, there is shown a circuit diagram of an open loop magnetic field scanner for producing a linear scan of the magnetic field intensity to a power of second or higher. This is combined with a magnetic field utilization device for providing an output proportional to the same power of the field. This output is fed to a recorder for recording as a function of the scan, whereby the recorded output spectrum is linear in the spectrum separation of units being measured for ease of calibration, interpretation and analysis.

More particularly, an electromagnet 1 generates a magnetic field H in the gap thereof, which contains the field utiliaztion device 2 such as for example a cycloidal mass spectrometer of the general type described in U.S. Patent 2,221,467. This type of mass spectrometer has an output mass spectrum in mass units proportional to the second power of the magnetic field intensity. Thus, for this example, the field should be scanned in proportion to the second power of the field intensity to provide a linear output in mass units. Other field utilization devices may require a higher order of magnetic field scan in order to provide a linear output.

The magnet 1 is energized from a magnet power supply 3 via the intermediary of a suitable field controller 4, such as, for example, a series current regulator, responsive to an input supplied via input terminal 5.

A secondary field scan generator 6, such as, for example, a stepping motor, supplies an output $\theta$, such as a shaft rotation, to the input of an $n^{th}$ power transducer 7, where $n$ is two or more. In the $n^{th}$ power transducer 7, typical examples of which are described below with regard to FIGS. 4 and 5, an input $\theta_i$ is converted to an output $\theta_o$ which is proportional to the $n^{th}$ power of the input. The input or output may comprise an electric, magnetic or mechanical quantity. For example, the input to the transducer 7 may comprise a mechanical movement or displacement such as shaft rotation to produce an output voltage proportional to the $n^{th}$ power of the input shaft rotation. The output of the transducer 7 is fed to an error detector 8 wherein it is compared with a reference output obtained from a primary field scan reference generator 9, such as a voltage source and potentiometer, to produce an error signal which is amplified by amplifier 11 for driving the field controller 4.

An output of the secondary scan generator 6, in a preferred embodiment, is fed to a recorder 12 for controlling the recorder base function such as chart speed or X direction travel of a pen carriage of an X–Y recorder. The output quantity from the field utilization device 2 to be recorded, such as the mass number output signal of a mass spectrometer, as amplified by amplifier 13, is fed to the other input of the recorder 12.

In operation, the secondary scan generator 6, through the $n^{th}$ power transducer 7 and field controller 4, causes the magnetic field to be scanned as the $n^{th}$ power of the scan generated by the secondary scan generator 6. A linear scan output of secondary scan generator 6 produces a linear scan of the magnetic field intensity to $n^{th}$ power. The output signal from the field utilization device 2 may be recorded by recorder 12 as a function of the linear scan output or it may be recorded as a linear function of time by the recorder 12, as desired. The secondary scan generator and the $n^{th}$ power transducer 7 may conveniently form a part of the recorder drive mechanism by being mechanically coupled to the conventional potentiometer drive shaft of a conventional potentiometer type chart recorder. The primary field scan reference generator 9 may be adjusted to a value to provide a convenient starting value of the magnetic field defining the starting point of the magnetic field scan.

For the preferred combination of the $n^{th}$ power field scanner and a cycloidal mass spectrometer 2, the $n^{th}$ power transducer 7 is selected to provide a second power output $\theta_i^2$ of its linear scan input $\theta_i$ derived from the linear secondary scan generator 6, whereby the output mass spectrum, as recorded by recorder 12, is linear in mass units allowing use of pre-calibrated recorder chart paper to facilitate calibration, interpretation and analysis of the output mass spectra.

The open loop field scan circuit of FIG. 1, while having the advantage of circuit simplicity, has the disadvantage that the linearity of the scan depends heavily upon the linearity of the field controller 4 and electromagnet 1. A high degree of linearity for these elements is typically difficult to achieve for wide dynamic scan ranges of magnetic field desired for some field utilization devices 2. For example, a wide range cycloidal mass spectrometer may require a dynamic range of $10^2/1$ for the magnetic field with a maximum field intensity approaching 10 kg.

Referring now to FIG. 2, there is shown a closed loop magnetic field scan system of the present invention. The same numerals will be used throughout the figures to identify the same elements and devices. This system is quite similar to that of FIG. 1 except that a feedback loop 15 has been provided. The feedback loop includes a field measuring device 16, such as a Hall-effect semiconductor, disposed in the magnetic field of the magnet 1 for measuring the magnetic field intensity. The field measuring device 16 provides an output proportional to the magnetic field intensity which is fed back to the error detector 8 to produce an error signal $\epsilon$ which corresponds to the algebraic sum of the primary field scan reference signal, field measurement signal, and the output of the $n^{th}$ power transducer. The circuit is arranged such that the feedback opposes or has a negative sign compared to the sum of the reference and transducer output. The error signal $\epsilon$ is then fed via amplifier 11 to the field controller 4 for causing the field intensity of the magnet 1 to track the $n^{th}$ power of the scan output derived from the secondary scan generator 6.

This closed loop system of FIG. 2 has the advantage as compared to the open loop system of FIG. 1 of eliminating nonlinearity effects of the magnet system including the magnet 1, power supply 3 and field controller 4, and amplifier 11. The system is subject to the non-linearity of the magnetic field measuring device 16, but Hall-effect devices 16 have the requisite linearity, i.e., less than 0.1% deviation from linearity over wide dynamic ranges. Consequently, linearity of the field scan obtained by the closed loop system, for wide dynamic scan ranges, far exceeds that obtained in practice for open loop systems of the type of FIG. 1.

Referring now to FIG. 3, there is shown another closed loop system for scanning the magnetic field in proportion to the $n^{th}$ power of a scan input. This system is similar to the system of FIG. 2 except that the $n^{th}$ power transducer 7 also serves as a field measuring device as its output is proportional to the $n^{th}$ power of the magnetic field intensity in which it is located. Such a transducer 7 is formed by a tandem connection of Hall-effect semiconductors, more fully described with regard to FIG. 5 and forming the subject matter of a copending application U.S. Ser. No. 528,949, filed Feb. 21, 1966 and assigned to the same assignee as the present invention.

The output of the $n^{th}$ power transducer 7 is fed back via feedback loop 15 to the error detector 8 wherein it is compared against an input directly proportional to the scan output derived from the output of the secondary scan generator 6, via a first power transducer 17 formed by potentiometer mechanically driven via shaft 18 from the secondary scan generator 6. The output error signal ε from the error detector 8 is used to cause the $n^{th}$ power of the magnetic field intensity, as sensed by the $n^{th}$ power transducer 7, to track the linear scan input from the scan generator 6. This closed loop system provides a very linear scan of the magnetic field to the $n^{th}$ power since the Hall-effect transducer 7 can be made to have a very high degree of linearity as, for example, greater than 0.1% over a wide dynamic range of magnetic field as of $10^2/1$. Also the first power scan transducer 17 can be made to have a comparable degree of linearity.

When the output of the primary field scan reference generator 9 is applied directly into the error detector as shown in the systems of FIGS. 1, 2 and 3, this reference output preferably should vary according to the same power as the output of the secondary scan transducer 7. In this manner, adjustment of the primary field scan reference generator 9 is linear in units of the field to $n^{th}$ power and thus linear calibration of the dial controlling the reference adjustment is possible. For example, when the primary field scanner is used for scanning the field according to the second power of the field for use with a cycloidal mass spectrometer, the primary field reference dial may have a linear calibration in atomic mass units corresponding to the output of the mass spectrometer 2. Accordingly, the operator may conveniently dial any desired mass unit via a linear scale on the dial and activate the scan generator 6 to scan a range around this mass, as desired. The embodiment of FIG. 3 is especially desirable since both the scan transducer 17 and the primary field scan reference generator may comprise first power transducers for producing their outputs as applied to the error detector 8.

Referring now to FIG. 4, there is shown the circuit diagram of an $n^{th}$ power transducer 7. The transducer 7 includes a source of voltage 21 as, for example, a battery which is connected across a potentiometer 22 having a resistance $R_1$ and a variable pick-off 23. The first output voltage of the potentiometer 22 is applied across a second potentiometer 24 having a resistance $R_2$ and an adjustable pick-off 25. Both pick-offs 23 and 25 are ganged together to an input shaft 26 serving as the input to the transducer 7. Resistors $R_1$ and $R_2$ have a resistance ratio of $R_2/R_1$ which is a large number as, for example, 250. Mechanical displacement of the shaft 26 produces a first voltage on the first pick-off 23 which is proportional to the input displacement $\theta_1$ of the shaft 26. The second voltage picked off by pick-off 25 is proportional to the second power $\theta_1^2$ of the input shaft displacement $\theta$, thus producing an output voltage which is proportional to the second power of the input. Higher power outputs of the input may be obtained by ganging additional potentiometers in like manner to the shaft 26 such that the output of each potentiometer serves as the input to the next and so on to the last potentiometer. Thus, an $n^{th}$ power transducer would have $n$ potentiometers ganged together.

Referring now to FIG. 5, there is shown an alternative $n^{th}$ power transducer 7. This transducer will be more fully described below with regard to the circuit of FIG. 7 but briefly comprises, for the second power, a pair of Hall-effect semiconductor devices 31 and 32. The input $\theta_1$ in this case is the magnetic field H in which the Hall-devices are immersed. A constant current is applied to the first Hall device, at right angles to the direction of the magnetic field, and an output voltage is obtained at output terminal 33 which is proportional to the intensity of the input magnetic field H. This output voltage is converted, by means not shown, into a current proportional to the voltage and thus proportional to H, and applied to the current input terminal of the second Hall device 32. The output voltage of the second Hall device 32 is proportional to the product of H and the input current, also proportional to H. Thus the output voltage is proportional to $H^2$ or, in other words, the second power of the input H. Higher order $n^{th}$ power transducers 7 may be obtained by driving additional Hall devices in like manner. In such devices $n$ Hall devices will provide an $n^{th}$ power transducer 7.

Referring now to FIG. 6 there is shown a more detailed circuit diagram for the field scanner system of FIG. 2. The Hall device 16 will operate with either A.C. or D.C. current but an A.C. system has advantages of linearity and in eliminating undesired drifts sometimes encountered in D.C. amplifiers and other elements. Therefore, the circuit of FIG. 6 uses A.C. in the sensitive parts of the system. A constant current audio generator 41 feeds an audio frequency current as of 1300 Hz. to a series circuit branch including a series connection of a pair of precision reference voltage potentiometers 43 and 44 and the Hall device 16. The $n^{th}$ power scan transducer 7, in this case a second power transducer, derives its constant voltage source from the potentiometer 44 via an isolation transformer 45. The secondary of the transformer provides the constant voltage source 21 across the resistor $R_1$ of the first ganged potentiometer 22. The output of the second power scan transducer 7 is applied in series to a circuit branch 46 forming the error detector 8.

The Hall device feedback output is derived from an output terminal 47 of the Hall device 16 and fed into the series error detector branch 46 via an isolation transformer 48 having a tuned primary to present a high impedance to the Hall device 16. The output of the primary field scan reference generator 9 is derived from the series potentiometer 43 and applied in series with the error detector branch 46 via isolation transformer 49 and another $n^{th}$ power reference transducer 7. The error signal ε, in the error detector branch 46, comprises the algebraic sum of the secondary scan derived voltage, Hall-effect feedback voltage, and the primary scan reference generator voltage.

The error signal is fed to an operational amplifier 51 having a high input impedance and a low output impedance. The output of the amplifier 51 is compared with a signal derived from the audio generator 41 in a phase sensitive detector 52 to produce a D.C. output error signal which is fed to the D.C. amplifier 11 for controlling the magnetic field scan in the manner as previously described with regard to FIG. 2.

Use of the second power transducer 7 in the reference voltage generator 9 permits the dial of the reference generator to be calibrated, by a linear scale on the dial controlling shaft 26, to read directly in terms of mass units when the field scanner is employed with a cycloidal type mass spectrometer 2.

Referring now to FIG. 7 there is shown the second power magnetic field regulator circuit of FIG. 3 in combination with a cycloidal mass spectrometer which is of a type characterized as having a mass output proportional to the second power of the magnetic field intensity. An audio frequency constant current source 61 supplies A.C. current at a frequency of, for example, 1200 Hz. to the current input terminal 62 of the first Hall crystal 63 via lead 64 and series resistor 73.

The Hall-effect crystal 63 is disposed in the magnetic field of the gap 65 of a powerful electromagnet 66 as indicated by the dotted lines leading to the gap of the magnet.

A Hall output voltage is obtained at terminal 67 and applied across the primary winding 68 of an isolation transformer 69 to produce an output voltage in the secondary 71 of the isolation transformer 69. The primary winding 68 is tuned by a capacitor and shunted by a temperature compensating resistor 72 having a temperature coefficient which is matched to the temperature coefficient of resistance of the Hall-effect semiconductor 63 to compensate for thermal effects in the Hall device.

More specifically, the tuned primary 68 is tuned for resonance at the audio frequency such as to provide a very high parallel impedance compared to the impedance of the resistor 72 such that the voltage applied across the primary 68 is determined by the voltage as seen across the temperature compensating resistor 72. Thus by matching the temperature coefficient of resistor 72 to the effective resistance of the Hall semiconductor 63, the output voltage appearing in the secondary of the isolation transformer 69 will be temperature compensated and proportional to the magnetic field intensity in the gap 65 of the magnet.

Series resistor 73 is a precision resistor with a variable tap 74 for tapping out a variable buck out voltage which is transformed via isolation transformer 75 to series opposition with the Hall-effect output in the secondary winding 71 of the first isolation transformer 69.

The primary circuit 76 of the isolation transformer 75 is tuned to the audio frequency to provide a high impedance to the resistor 73. The buck out voltage derived from resistor 73 is transformed into the secondary 77 of transformer 75 and serves to buck out the voltage obtained from the Hall device 63. By adjustment of the contact 74 an error signal corresponding to the difference between the output voltages of the Hall-effect devices 63 and the buck out voltage is produced which corresponds to the difference between the magnetic field intensity over the Hall device 63 and some other value of this magnetic field, as selected by tap 74, which will cause the voltage generated by the Hall-effect device to just equal the voltage selected by the contact 74. Thus contact 74 serves as a primary field selector for selecting a magnetic field intensity that will be tracked by the feedback loop via the error signal.

The primary field control error signal is fed to the input terminal of a high current gain amplifier 78 such as, for example, a Burr-Brown operational amplifier model 1513. The output of the amplifier 78 is fed to the primary 79 of a voltage step up transformer 81 having a voltage step up ratio of, for example 1 to 10. The current output of the transformer 81 such as, for example, 10 milliamps is fed to the current input terminal 82 of the second Hall-effect semiconductor 83 also located in the magnetic field of the gap 65 of the electromagnet 66 as indicated by the dotted circle with the lead line leading to the magnet gap 65.

As in the circuit of the first Hall crystal 63, the output voltage of the second Hall crystal 83 is applied across the tuned primary winding 84 of an isolation transformer 85 to produce an output voltage in the secondary winding 86 proportional to the square of the magnetic field intensity in which the first and second Hall devices are located. A temperature compensating resistor 87, as previously described with regard to the first Hall-effect semiconductor, is provided connected across the primary winding of the transformer 85 to compensate for thermal effects of the Hall-effect semiconductor 83.

A scan reference voltage $V_r$ is applied in series with the secondary winding 86 of the second Hall device transformer 85. The reference voltage $V_r$ is obtained from a potentiometer pick-off 88 connected across the secondary winding 90 of a transformer 89, the primary 91 of which is variably tapped across portions of series connected resistors 92 connected in series with the current circuit of the first Hall-effect semiconductor 63 via lead 64 and forming a voltage dividing network. Variable adjustment of potentiometer pick-off 88 introduces an A.C. reference voltage $V_r$ of variable magnitude into the error detector circuit 8 formed by the series branch including secondary winding 86 and scan reference source 9 with its potentiometer. The output circuit of the second Hall device 83 forms the feedback path 15 for applying the $B^2$ dependent Hall voltage into the error detector 8.

The error signal $E_0$ produced by the difference between the scan reference voltage $V_r$ and the second Hall device output voltage is fed to the input of a high input impedance A.C. amplifier 93 wherein it is amplified and fed to one input terminal of a phase sensitive detector 94.

In the phase sensitive detector 94 the amplified error signal is compared with a reference voltage obtained from the audio current source 61 via lead 95 to produce a phase sensitive D.C. output error signal which is fed to the input of the D.C. amplifier 11 previously described in FIG. 3. The output of the D.C. amplifier is fed to the input of the series regulator 4 for controlling the magnetic field of the electromagnet 66 by controlling the amount of current supplied to the electromagnet coil 1 as derived from the magnet power supply 3.

A cycloidal mass spectrometer 96 of the type shown and described in U.S. Patent 2,221,467, issued Nov. 12, 1940 is disposed in the gap 65 of the electromagnet 66. The cycloidal mass spectrometer 96 includes an evacuated vacuum envelope 97 as of stainless steel including therewithin a series of rectangular frame-like electrodes 98 for producing a uniform electric field E at right angles to the direction of the magnetic field B in the gap 65. An ion source 99 projects a stream of ionized gas particles to be analyzed into the region of crossed electric and magnetic fields. Under the influence of the crossed electric and magnetic fields the charged ions execute a cycloidal trajectory and are collected on a detector electrode 101 to produce an output signal corresponding to gas ions having a certain mass. The output signal from the detector 101 is fed to an electrometer type amplifier 13 wherein the signal is amplified and thence fed to one input of a recorder 12 wherein the mass output signal is recorded as a function of the magnetic field scan.

The magnetic field scan is developed by a scan generator 6 which provides an input signal to the recorder 12 and also serves as by, for example, a mechanical linkage 18 to vary the position of the scan reference pick-off 88 to scan the reference voltage $V_r$ applied to the error detector 8 in the magnetic field scan unit. In this manner the magnetic field intensity B is caused to be scanned in a linear manner proportional to the second power of the magnetic field intensity whereby the spectral lines of the mass spectrometer 96 are caused to be recorded in a linear separation by mass units on the recording chart of recorder 12. This occurs because the mass unit focused at the detector 101 is proportional to the second power of the magnetic field intensity.

Other types of mass spectrometers also have a mass output which is proportional to the second power of the spectrometer's ion focusing magnetic field intensity. Such mass spectrometers include, for example, the conventional single magnetic deflection type mass spectrometers.

Recording the output of the mass spectrometers with a linear scan of mass units is particularly advantageous as it greatly facilitates calibration, analysis and interpretation of output mass spectra. Linear precalibrated recording paper may be used and the number of mass units for unknown recorded mass lines is readily obtained by measuring the distance on the precalibrated paper from the recorded known to the recorded unknown mass line.

Referring now to FIG. 8, there is shown a mass spectrometer system wherein the magnttic field is scanned in proportion to the first power of the magnetic field intensity to produce a recorded mass spectrum with linear separation by mass units.

In this system the $n^{th}$ power transducer 7 comprising the tandem connection of a pair of Hall-effect devices feeds its second power of the field output ($V \alpha B^2$) to the base function input terminals of the recorder 12 for recording against the mass spectrum output ($m \alpha B^2$) of the mass spectrometer 96. In such a case the recorded mass spectrum will be linear in terms of the number of mass units separation taken along the base line of the recording to facilitate calibration, analysis and interpretation of the output spectra.

Referring now to FIG. 9, there is shown in more detail the circuit of FIG. 8. The circuit is quite similar to that of FIG. 7 and the same elements are given the same reference number, and only the differences between the circuits will be explained in detail. The error detector 8 is formed by the series branch formed by the series connection of the outputs of the primary field selector 74, first Hall crystal 63 and field scan reference source 17. The ouput $E_0$ of the error detector 8 is amplified by amplifier 78 and phase compared with a signal from the audio generator 61 to produce a D.C. error signal for scan of the field H in a linear scan according to the output of the scan generator 6. The output of the first Hall device 63 is tapped off the primary 68 of the isolation transformer 69 via lead 102 and fed to the input of the operational amplifier 78 for converting the first Hall voltage into a current proportional to the Hall voltage.

The output of the second Hall device 83 is amplified in 93 and phase detected in phase detector 94 as further D.C. amplified by amplifier 11, is fed to the base function input of the recorder 12. The signal input for the recorder 12 is derived, as before, from the spectrometer 96 and amplifier 13.

Since many change could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a magnetic field scan apparatus for producing a linear scan of magnetic field intensity to a power higher than the first power of the magnetic field intensity including, means for controlling the intensity, of the magnetic field in response to a scanned input quantity applied to said controller means, means for transducing an input quantity applied to said transducer to an output quantity of said transducer which is proportional to its input quantity taken to a power of its input higher than the first power, and means for deriving from the output quantity of said transducer means the linear scanned input quantity to said controller means for linear scanning of the magnetic field intensity in proportion to a power of the magnetic field higher than the first.

2. The apparatus according to claim 1 including, means forming a scan generator for deriving the scanned input quantity to said controller means.

3. The apparatus according to claim 2 including means interconnecting said scan generator means and said transducer means for applying the scanned output quantity of said scan generator means as the input to said transducer means and wherein the output quantity of said scan generator is the position of a shaft at the output of said scan generator.

4. The apparatus according to claim 2 wherein field scan apparatus includes, a closed loop circuit portion having a feedback means for deriving an output quantity from a measure of the magnetic field being scanned, and including error detector means for comparing the feedback output quantity with an input quantity derived from the output quantity of said scan generator means to produce an error scan output quantity which is applied as the scanned input quantity to said field controller means.

5. The apparatus according to claim 4 wherein said feedback means includes a Hall-effect device for measuring the magnetic field to derive the feedback output quantity.

6. The apparatus according to claim 4 wherein the output quantity of said scan generator means is the position of a shaft at the output of said scan generator and said shaft position being applied directly as the input quantity to said transducer means.

7. The apparatus according to claim 4 wherein the second power of the magnetic field intensity is scanned and including, means forming a mass spectrometer of the type wherein the output in mass units is proportional to the second power of the scanned magnetic field employed as the magnetic focusing field thereof, and wherein said spectrometer means is disposed in the scanned magnetic field of the field scan apparatus to employ the scanned field as the focusing field thereof, whereby the mass spectrum output signal of said spectrometer means is linear in mass units.

8. The apparatus according to claim 7 including, a recorder means for recording the mass spectrum output signal of said mass spectrometer means and wherein said scan generator means has its output quantity connected to said recorder means to record the output mass spectrum as a function of the output quantity derived from said scan generator means, whereby calibration, analysis and interpretation of the recorded mass spectrum is facilitated.

References Cited

UNITED STATES PATENTS

| | | | |
|---|---|---|---|
| 3,162,805 | 12/1964 | Robertson | 324—45 |
| 3,244,876 | 4/1966 | Kanda et al. | |
| 3,267,368 | 8/1966 | Rock et al. | 324—45 |
| 3,342,991 | 9/1967 | Kronenberger. | |

RALPH G. NILSON, Primary Examiner

S. C. SHEAR, Assistant Examiner